United States Patent [19]

Nakashima et al.

[11] Patent Number: 4,551,173
[45] Date of Patent: Nov. 5, 1985

[54] METHOD FOR ADJUSTING COMPOSITION OF MOLTEN STEEL IN ARC PROCESS

[75] Inventors: Hirohisa Nakashima; Yoshimi Komatsu; Masafumi Ikeda; Tsuneo Kondö, all of Fukuyama, Japan

[73] Assignee: Nippon Kokan Kabushiki Kaisha, Tokyo, Japan

[21] Appl. No.: 675,947

[22] Filed: Nov. 28, 1984

[30] Foreign Application Priority Data

Sep. 28, 1984 [JP] Japan .......................... 59-145887[U]
Sep. 28, 1984 [JP] Japan ............................... 59-203640
Oct. 11, 1984 [JP] Japan ............................... 59-213094
Oct. 12, 1984 [JP] Japan ............................... 59-213334

[51] Int. Cl.³ ............................................. C21C 5/52
[52] U.S. Cl. ......................................... 75/12; 75/51.7
[58] Field of Search ............................... 75/12, 59, 13

[56] References Cited

U.S. PATENT DOCUMENTS 3,708,599  1/1973  Krause ..................................... 75/12
4,308,415 12/1981  Hasegawa ............................... 75/12
4,362,556 12/1982  Kishida ................................... 75/12

Primary Examiner—Peter D. Rosenberg
Attorney, Agent, or Firm—Frishauf, Holtz, Goodman & Woodward

[57] ABSTRACT

Molten steel is refined in a converter and is poured from the converter to a ladle. A ferro-alloy containing a component to be adjusted is added to the molten steel as needed. An amount of the alloy to be added to the molten steel in the ladle is calculated from a composition analysis value of the molten steel in the converter, and the amount of the alloy which is added when the molten steel is poured from the converter. The thus calculated amount of the alloy is added to the molten steel in the ladle. Electrodes are submerged in a slag layer on the molten steel so as to be arranged a predetermined distance from the molten steel. Power is supplied to the electrodes so as to generate electric arcs between the electrodes and the molten steel, thereby, arc-heating the molten steel. Simultaneously, a lance is submerged in the molten steel, and an Ar gas is injected in the molten steel therethrough, thus stirring the molten steel. Since deoxidation and composition adjustment of the molten steel can be simultaneously performed, processing time can be shortened.

18 Claims, 10 Drawing Figures

METHOD FOR ADJUSTING COMPOSITION OF MOLTEN STEEL IN ARC PROCESS

BACKGROUND OF THE INVENTION

The present invention relates to a method of adjusting the composition of molten steel in an arc process in which an electrode is submerged in a slag layer on molten steel contained in a ladle, and an electric arc is generated between the molten steel and the electrode so as to arc-heat the molten steel.

Molten steel is refined in a steel converter and an arc process is then performed, thereby decreasing the temperature of the molten steel refined in the converter. Thus, losses of additives used and consumption of furnace wall refractory material of the converter can be decreased, and the yield of the molten steel from the converter can be improved. When the arc process is performed in practice, preferably, a carbon electrode is submerged in a slag layer on the molten steel, and an electric arc is generated between the electrode and the molten steel while the electrode is substantially covered with the slag (namely, submerged arc heating). When the slag does not cover the electrode, an arc jumps between the electrode and the ladle furnace wall or between the electrode and a gas blow lance, thus causing damage to the refractory material in these portions. In addition, the furnace wall refractory material is heated undesirably by heat radiated from an arc column.

When the molten steel is arc-heated, an alloy is added to the molten steel so as to adjust the composition of the molten steel. However, in the case of submerged arc heating, since the slag layer is on the molten steel, the added alloy is prevented by the slag from mixing with the molten steel. For this reason, the efficiency of an alloy additive is low.

In the arc process, when the composition of the molten steel is adjusted, the molten steel is poured from the converter into the ladle, and the oxygen partial pressure $P_{O_2}$ of the molten steel in the ladle is measured, as shown in the timing chart in FIG. 1. Then, aluminum serving as a deoxidation material is added in the molten steel in accordance with the measured $P_{O_2}$ value. The molten steel is then arc-heated so as to perform deoxidation. Thereafter, the composition of the molten steel is analyzed by sampling, and the molten steel is arc-heated again. When an analysis result is determined, arc heating is stopped and a desired amount of ferro-alloy is added to the molten steel. Ar gas is blown into the molten steel so as to stir it. Finally, the molten steel is sampled and refining by the arc process thus reaches completion.

However, in the conventional method for adjusting the composition, arc-heating of the molten steel must be continued until the analysis result is determined by sampling the molten steel, which is a time-consuming process. In addition to this, deoxidation by adding Al and adjustment of the composition by adding ferro-alloy are performed at different points, thus further prolonging the time required for processing.

In order to control sulfide inclusion to a spherical shape in solidified steel, calcium (Ca) is added in the molten steel. However, since Ca has a lower boiling point (1,483° C.) than the melting point of the steel and an extremely high vapor pressure, even if a Ca alloy is added to the molten steel by a so-called injection method, Ca-wire method, bullet shooting method or the like, the yield of Ca added is low, e.g., about 10%. In addition, the yield varies widely. For this reason, much of the Ca alloy used is wasted, and hydrogen and nitrogen pick-up of the molten steel and a decrease in a temperature thereof occur.

Furthermore, in order to manufacture high nitrogen steel, manganese nitride is conventionally added to the molten steel. However, when manganese nitride is used, the cost is increased. The yield of manganese nitride is unstable, and magnanese content of the molten steel is increased undesirably.

SUMMARY OF THE INVENTION

It is an object of the present invention to provide a method of adjusting the composition of molten steel in an arc process, in which the yield of additives is improved and the processing time can be shortened.

A method of adjusting the composition of molten steel in an arc process according to the present invention comprises the steps of: pouring molten steel obtained by converter steelmaking into a ladle while adding an amount of an additive containing a component to be adjusted to the molten steel as needed; calculating the amount of the additive to be added to the molten steel in the ladle with reference to a composition analysis value of the molten steel in the converter and the amount of the additive added to the molten steel when it is poured from the converter, and adding the additive of the amount calculated in this step to the molten steel in the ladle; submerging an electrode in a slag layer on the molten steel, holding the electrode at a position in a predetermined distance from the molten steel, and supplying power to the electrode so as to generate an electric arc between the electrode and the molten steel, thereby arc-heating the molten steel; and introducing a gas in the molten steel through a lance submerged therein, thereby stirring the molten steel.

According to the present invention, before arc heating starts, a predetermined amount of additive, such as ferro-alloy containing a component to be adjusted is added to the molten steel, and deoxidation and composition adjustment are simultaneously performed by arc heating. For this reason, processing time of the arc process can be shortened in comparison with a conventional method, thus improving operability and reducing costs in power, refractory materials, Ar gas and the like. In this manner, since the yield of the additive is high, a desired component can be stably adjusted.

DETAILED DESCRIPTION OF THE PREFERRED EMBODIMENT

Figure 1:
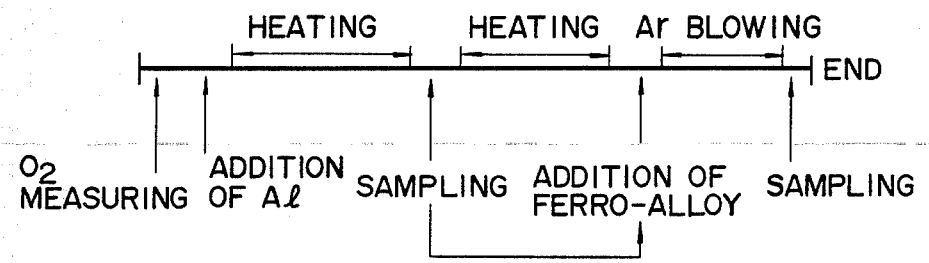
FIG. 1 is a view showing operation timings in a conventional arc process.
Figure 2:
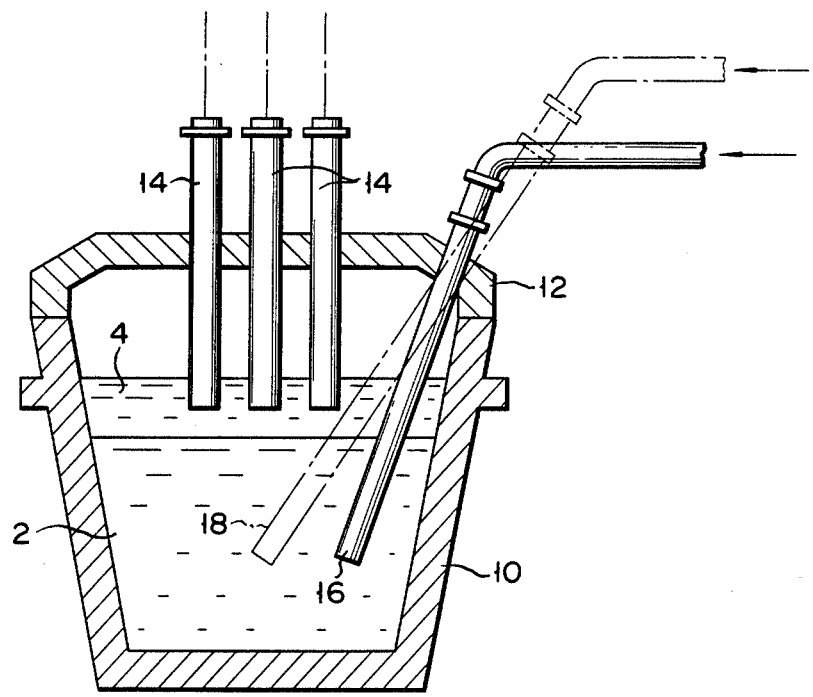
FIG. 2 is a sectional view showing an apparatus used in an arc process.
Figure 3:
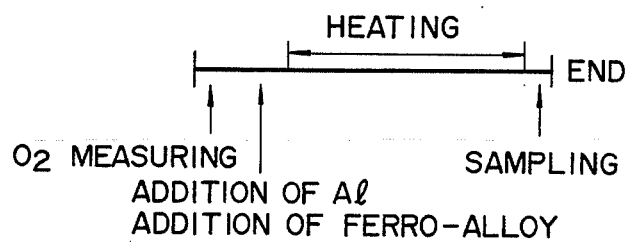
FIG. 3 is a view showing operation timings according to an embodiment of the present invention.

FIG. 2 shows a sectional view of an apparatus used in an embodiment of the present invention. Molten steel 2 is refined by oxygen gas top blowing in a converter (not shown) and is then poured from the converter into a ladle 10 without being deoxidized. Before pouring, a desired amount of ferro-alloy (e.g., ferrosilicon, ferromanganese or the like) can be charged in the ladle 10 as needed. The ferro-alloy is melted by the heat of the molten steel poured from the converter, and the ferro-alloy component (e.g., silicon, manganese or the like) is added to the molten steel. After flux is added on the molten steel, a cover 12 is arranged on the ladle 10. An inert gas, e.g., Ar gas, is introduced in the ladle 10 so as to place the interior of the ladle 10 in an inert gas atmosphere. Then, as shown in FIG. 3, the molten steel is sampled through a hole (not shown) formed in the cover 12, and an oxygen partial pressure $P_{O_2}$ in the molten steel is then measured.

The amount of Al to be added is calculated with reference to the measurement of the oxygen partial pressure and a desired deoxidation amount. An amount of a ferro-alloy to be added to the molten steel is calculated from a composition analysis value of the molten steel in the converter and the amount of the ferro-alloy added when the molten steel is poured from the converter to the ladle. In other words, respective contents of the components contained the molten steel in the ladle are calculated from the composition analysis value of the molten steel in the converter, and the amount and composition of ferro-alloy added when the molten steel is poured from the converter. The type and amount of ferro-alloy to be added to the molten steel in the ladle is determined from a difference between the target composition and the calculated composition. The thus determined amount of ferro-alloy is added to the molten steel.

Carbon electrodes 14 and a gas blowing lance 16 are inserted into the ladle 10 through holes formed in the cover 12. The electrodes 14 are arranged along a vertical direction. The lance 16 is submerged in the molten steel 2 and is slightly inclined. An electric arc is generated in a predetermined arc gap between the nondeoxidized molten steel 2 and the electrodes 14. The flux is melted by arc-heating so as to form a layer of molten slag 4 on the molten steel. In this case, the amount of the flux added is adjusted to obtain a slag layer into which the electrode is submerged by about 50 mm. While the molten steel is arc-heated, Ar gas is introduced in the molten steel through the submerged lance 16 so as to stir the molten steel. The molten steel is deoxidized and a desired component is added thereto, thus obtaining molten steel having the desired composition. In this manner, nondeoxidized molten steel is arc-heated for a predetermined period of time (e.g., 15 minutes), and thereafter, arc-heating is stopped and the electrodes 14 and the lance 16 are raised.

Thereafter, a lance 18 for vigorously stirring the molten steel is inserted in the ladle 10 and is submerged in the molten steel. Ar gas is now introduced in the molten steel at a higher flow rate than that during arc-heating, thereby vigorously stirring the molten steel. Thus, the temperature and the composition of the molten steel become uniform. After arc-heating, the molten steel is transferred to RH-decarburization equipment, and the molten steel is decarburized. Since the molten steel is charged from the converter to the ladle and thereafter is arc-heated, the temperature of the molten steel, when it is poured from the converter, can be 1,650° C. or less.

As described above, predetermined amounts of the deoxidation material Al and ferro-alloy are added to the molten steel before arc-heating. Deoxidation and adjustment of the composition are simultaneously performed by arc-heating, thus considerably shortening the time required for the arc process. Therefore, operability can be improved and costs in power, refractory materials and Ar gas can be reduced.

Figure 4:
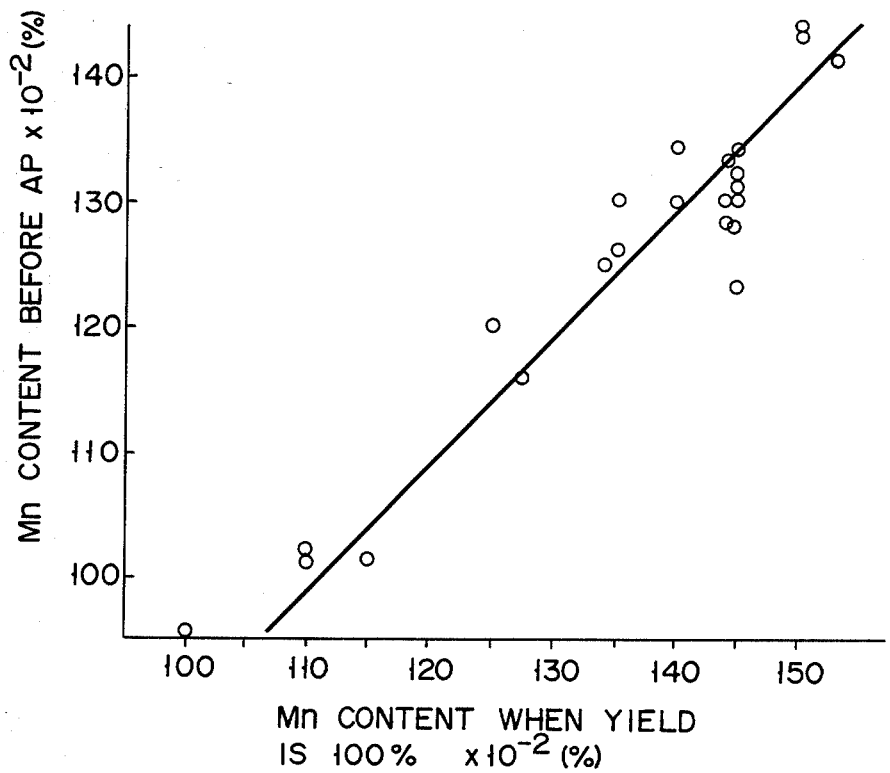
FIG. 4 is a graph showing the relationship between an Mn content, calculated by assuming that the yield thereof is 100%, and an analysis value thereof.
Figure 5:
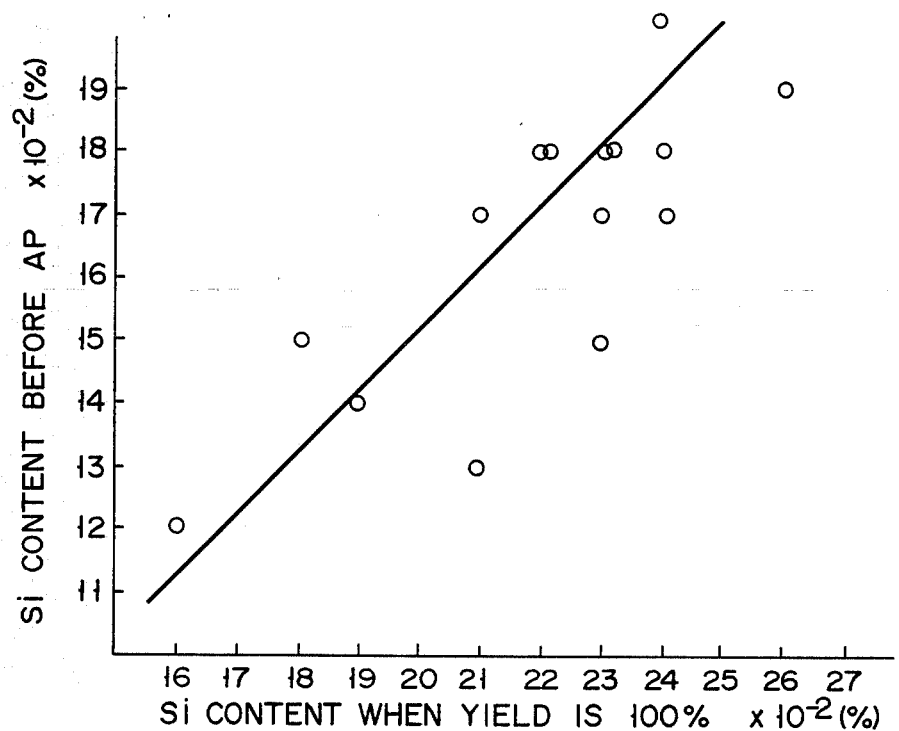
FIG. 5 is a graph showing the relationship between an Si content, calculated by assuming that the yield thereof is 100%, and an analysis value thereof.

Since the yield of the ferro-alloy added to the molten steel is high, the desired component can be stably adjusted. FIGS. 4 and 5 respectively show examples of the yields of ferro-alloys added to the molten steel in Mn and Si composition adjustment when the molten steel is poured from the converter. The content of a component calculated from the amount of ferro-alloy added when the molten steel is poured from the converter, is plotted along the abscissa assuming that the component yield is 100%. A content of each component which is analyzed when the molten steel is transferred to arc process equipment is plotted along the ordinate. As is apparent from FIG. 4, the yield of Mn is constant and is about 92%. Further, as is apparent from FIG. 5, the yield of Si is about 77%. The yields of the respective components are high and constant.

In this embodiment, the average processing time required for 250 t of molten steel is 19.7 minutes, and heating time is 11.3 minutes. However, in the conventional process, the average processing time is 29.9 minutes and heating time is 13.8 minutes.

In order to control formation of a sulfide inclusion, Ca, for example, is preferably added to the molten steel at a flow rate (added speed) of 30 kg/min or more.

Figure 6:
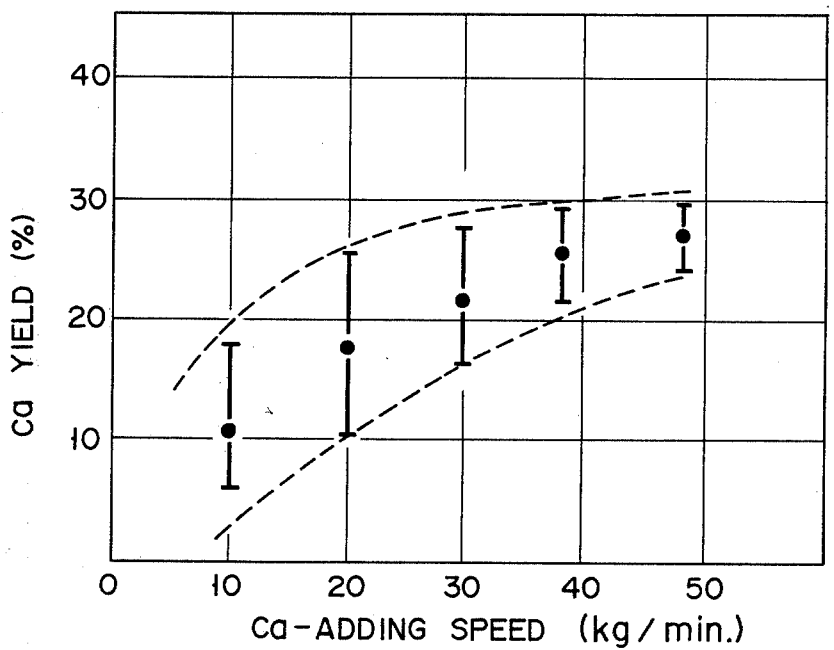
FIG. 6 is a graph showing a Ca yield.

FIG. 6 shows the relationship between a Ca addition rate and the Ca yield. Ca is added to the molten steel by an injection method in such a manner that a Ca-Si alloy powder is carried by Ar or $N_2$ gas, and is blown into the molten steel through the submerged lance. The temperature of the molten steel immediately after adding Ca falls within the range between 1,575° and 1,585° C., and is substantially constant. In FIG. 6, respective dots represent average values per 20 charges, and bars indicate ranges of variations of the respective dots. As is apparent from FIG. 6, the Ca yield is increased in accordance with an increase in the Ca addition rate, and the variation of yield for a given value is small.

This phenomenon can be explained as follows. When the amount of Ca added is constant, the time-over which Ca is added is prolonged when the addition rate is lower. When Ca is added by the injection method, the molten steel is stirred by the carrier gas blown therein during the Ca addition process. Also, in the bullet shooting method and the Ca-wire method, in order to uniformly distribute a Ca alloy in the molten steel, the molten steel is stirred. When the Ca addition time is long, the Ca alloy which is initially added to the molten steel is stirred for a long time. Therefore, Ca which has a low boiling point and high vapor pressure is easily separated from the molten steel. The reason for this is when the Ca addition time is long, the amount of Ca loss is increased and the Ca yield is decreased.

In FIG. 6, when the Ca addition rate is 10 kg/min, the Ca addition yield is the same as that in the conventional process, i.e., about 10%. When the Ca addition rate exceeds 30 kg/min, the Ca yield is increased to about 20% or more. Nevertheless, when the Ca addition rate is further increased, the Ca yield increases more slowly, and is preferably added to the molten steel at a rate of just over 30 kg/min.

Methods for adding Ca to the molten steel include the injection method in which a Ca alloy powder such as a Ca-Si alloy is carried by a gas and is blown in the molten steel through the lance, a bullet shooting method in which Ca alloy particles are shot in the molten steel, and a Ca-wire method in which a Ca alloy wire coated with iron is provided in the molten steel. The method for adding Ca can be any of the injection, bullet shooting, and Ca-wire methods.

The Ca addition yield can be doubled or more, and variations are small in comparison with the conventional process. Therefore, the amount of Ca alloy can be decreased, thus reducing cost. Since the addition time for adding Ca alloy can be shortened, the decrease in temperature of the molten steel is small. In addition to this, hydrogen and nitrogen pick-up of the molten steel is prevented. When an injection lance is used so as to add the Ca alloy, the life thereof can be prolonged. Furthermore, since the amount of the Ca alloy added is small, a content of an undesired component is not increased, thereby avoiding contamination of the molten steel.

In this embodiment, when nondeoxidized molten steel is poured from the converter to the ladle, nitrogen pick-up can be prevented and the nitrogen content of the molten steel can be reduced. If the oxygen content in the molten steel is low, adsorption of nitrogen gas is increased. Therefore, if the deoxidized molten steel is poured from the converter to the ladle, the nitrogen content in the molten steel is increased. On the contrary, in this embodiment, since nondeoxidized molten steel is poured from the converter to the ladle, the adsorption of nitrogen is low.

Preferably, after the slag on the molten steel in the ladle is removed, the deoxidation material Al is added to the molten steel. If the slag is present, Al added to the molten steel reacts partially with the slag, and is therefore prevented from deoxidizing the molten steel. Furthermore, since the amount of Al which reacts with the slag varies widely, the amount of deoxidation is easily changed. The slag is preferably removed by a vacuum suction method (VSC process).

When the nondeoxidized molten steel is poured from the converter to the ladle and 1.20 kg/ton of Al is added to the molten steel so as to deoxidize it, the nitrogen content of the molten steel after refining is 15 to 20 ppm. However, in a conventional process, when 1.55 kg/ton of Al is added to the molten steel when it is poured from the converter to the ladle, the nitrogen content of the molten steel after refining is 20 to 30 ppm. Furthermore, with the process according to this embodiment, the amount of Al added can be decreased and Al content in the molten steel can be controlled within a narrow range (i.e., 0.015%).

Figure 7:
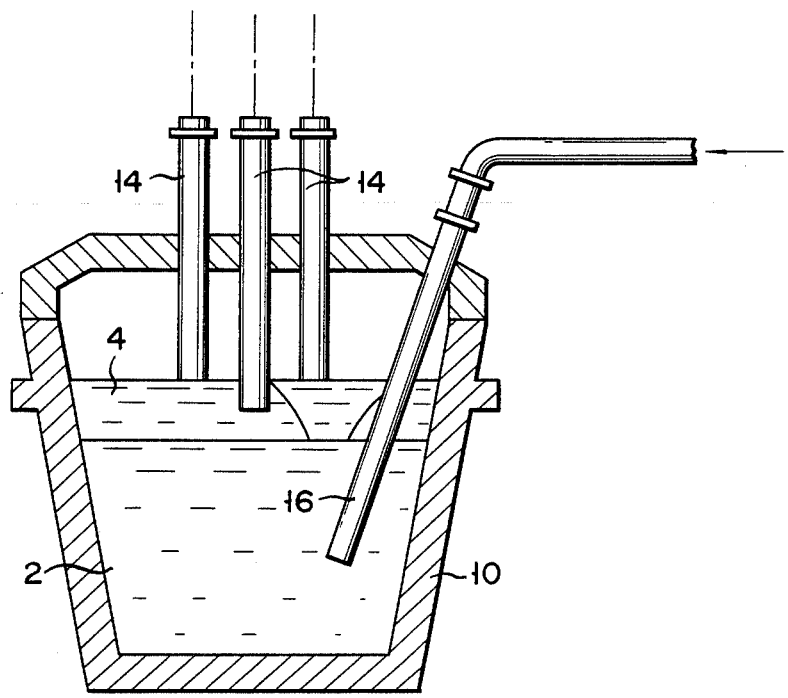
FIG. 7 is a sectional view showing a state where a 4-holed lance is used.
Figure 8:
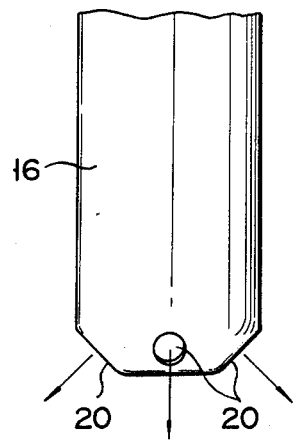
FIG. 8 is an enlarged view showing a lower end portion of the lance in FIG. 7.

A stirring lance 16 which can add an alloy for adjusting the composition of the molten steel with high efficiency will be described hereinafter. FIG. 7 shows the molten steel stirred by the lance 16, and FIG. 8 is an enlarged view showing a lower end portion of the lance 16. The lance 16 is obliquely inserted in the ladle 10, and a lower portion thereof is submerged in the molten steel 2. The lance 16 is arranged so as to be inclined at 8.8 degrees with respect to the vertical direction so that a gas blow portion at the lower end thereof is shifted from the center of the ladle 10 by about 900 mm and is spaced from the bottom surface of the ladle 10 by 800 mm. As shown in FIG. 8, four gas blow ports 20 are formed in the lower end portion of the lance 16. Each of these gas blow ports 20 has a diameter of 8 mm. The gas blow ports 20 are arranged so that the gas is blown at an angle of about 45 degrees with respect to the longitudinal direction of the lance 16 and is radially spread in four directions.

When the arc process is performed with the molten steel stirring lance 16 having the above arrangement, Ar gas is introduced in the molten steel through the lance 16 at a flow rate of 400 to 500 Nl/min (1.6 to 2 Nl/min per ton of the molten steel) so as to stir the molten steel. Then, an electric arc is generated between the electrode and the molten steel, thereby heating the molten steel. After 15 minutes, the arc heating is stopped and the flow rate of Ar gas is increased to 600 to 800 Nl/min (2.4 to 3.2 Nl/min per ton of the molten steel). Thus, waves are caused on the surface of the molten steel, and the slag on the surface subsides from a region having a diameter of 1 to 1.8 m, thereby exposing the surface of the molten steel.

Figure 9:
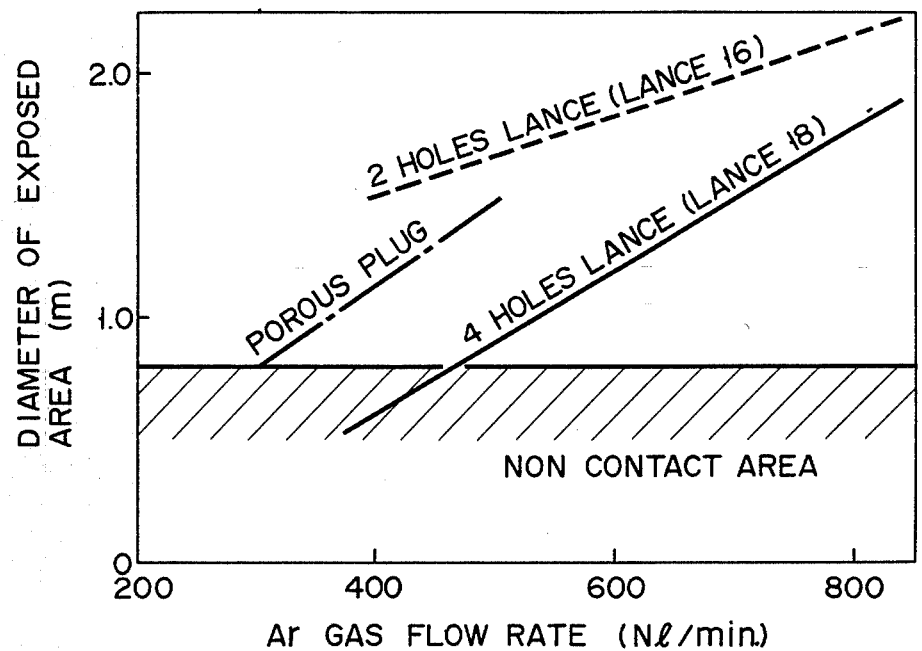
FIG. 9 is a graph showing the relationship between a flow rate of Ar gas and a diameter of a molten steel exposed region.

FIG. 9 shows the relationship between the flow rate of Ar gas and the diameter of an exposed region of the surface of the molten steel. In FIG. 9, the solid line represents the case when the lance according to this embodiment is used, and the dotted line represents the case when a 2-port T-shaped lance having a diameter of 10 mm is used. The alternate long and short dashed line represents the case when the gas is blown in the molten steel from the bottom of the ladle 10 using a porous plug. In FIG. 9, the hatched region represents the range in which the molten steel is not in contact with the electrode even if the molten steel is stirred by the gas. As is apparent from this graph, in the case of the lance 16 according to this embodiment having the four ports 20 for blowing the gas at an angle of 45 degrees with respect to the longitudinal direction of the lance, although the flow rate of Ar gas is high, only slight waves are caused in the surface of the molten steel. It is found that this is the optimal lance for injecting the gas while the electrodes are mounted. When the molten steel is stirred in the ladle in which the electrodes are mounted, the 4-port lance 16 shown in FIG. 8 is used. While the molten steel is arc-heated, Ar gas is blown in the molten steel at a maximum flow rate of 400 to 500 Nl/min at which point the molten steel is not in contact with the electrodes, as seen from FIG. 9. However, when an alloy is added to the molten steel, Ar gas is injected at a flow rate of 600 to 800 Nl/min in order to expose a region from which the alloy can be added to the molten steel without contacting the slag. As is apparent from FIG. 9, the slag subsides over a region having a diameter of 1 to 1.8 m, thus exposing the surface of the molten steel. Then, the alloy for adjusting the composition of the molten steel is added to this exposed region. Since the lance is inclined, this region appears at a position away from a surrounding portion of the lance, and the lance 16 does not interfere with the addition of the alloy. Since the gas blow ports 20 of the lance 16 are not located at the central portion of the ladle 10, the exposed region appears at a position away from the electrode 14. The alloy added is also not interfered with by the electrodes 14. The gas flow rate is reduced after adding the alloy, and the arc-heating is restarted, thereby heating the molten steel to a predetermined temperature.

With the lance 16, when the alloy for adjusting the composition of the molten steel is added to the molten steel, an exposed region can be obtained by causing a wave in the molten steel from which the slag subsides. This region is located so as not to be interfered with by the lance or the electrodes. Therefore, the alloy is added to the molten steel without coming into contact and reacting with the slag, thus improving the yield of the alloy additive.

Next, a method in which stirring efficiency can be improved without causing a wave in the surface of the molten steel will be described. When the molten steel is stirred by the lance 18 after arc-heating, Ar gas is blown into 250 t of molten steel at the flow rate of 500 to 1,000 Nl/min (2 to 4 Nl/min per ton of the molten steel). However, when the flow rate of Ar gas is increased in order to improve the stirring efficiency, this causes waves in the surface of the molten steel, and the electrodes are adversely affected. On account of this, flux is mixed in Ar gas while the flow rate of Ar gas is kept unchanged. In other words, the flux is blown into the molten steel by the Ar gas. The amount of flux added preferably falls within the range between 5 and 30 kg/kg (solid/gas ratio). A particle size of the flux is preferably about 1 mm. The flux can be a material for forming slag such as lime, an alloy powder or the like.

When the flux is blown in the molten steel, the flux particles rise in the molten steel together with the Ar gas. Accordingly, the molten steel is stirred with a high stirring efficiency, and processing time can be shortened. Meanwhile, waves are not caused in the surface of the molten steel. When the material for forming slag is used as the flux, the reaction between the slag and the molten steel is accelerated, thereby shortening the time required in arc process. Alloy powder can be used to adjust the composition of the molten steel. For example, when lime-CaO flux having a solid/gas ratio of 20 kg/kg is blown into 250 t of molten steel by Ar gas at a flow rate of 1,000 Nl/min, stirring time is 20 minutes. On the other hand, when no flux is used, stirring time is 30 minutes.

A refining method in which the nitrogen content can be increased with a stable yield and low cost, so as to provide high nitrogen steel, will be described hereinafter.

After stirring the molten steel with Ar gas, nitrogen gas is used instead of Ar gas and is blown through the bubbling lance 16 or 18, thereby increasing the nitrogen content of the molten steel to a predetermined value. Since the yield of nitrogen gas is about 60%, the amount of nitrogen gas to be blown can be set with reference to this yield.

The relationship between the amount of nitrogen added and an increase in the nitrogen content in the molten steel where nitrogen gas is blown in the molten steel in a non-oxidizing atmosphere (example), and where manganese nitrogen is blown in the molten steel (comparative example) were examined. The results are shown in FIG. 10.

Figure 10:
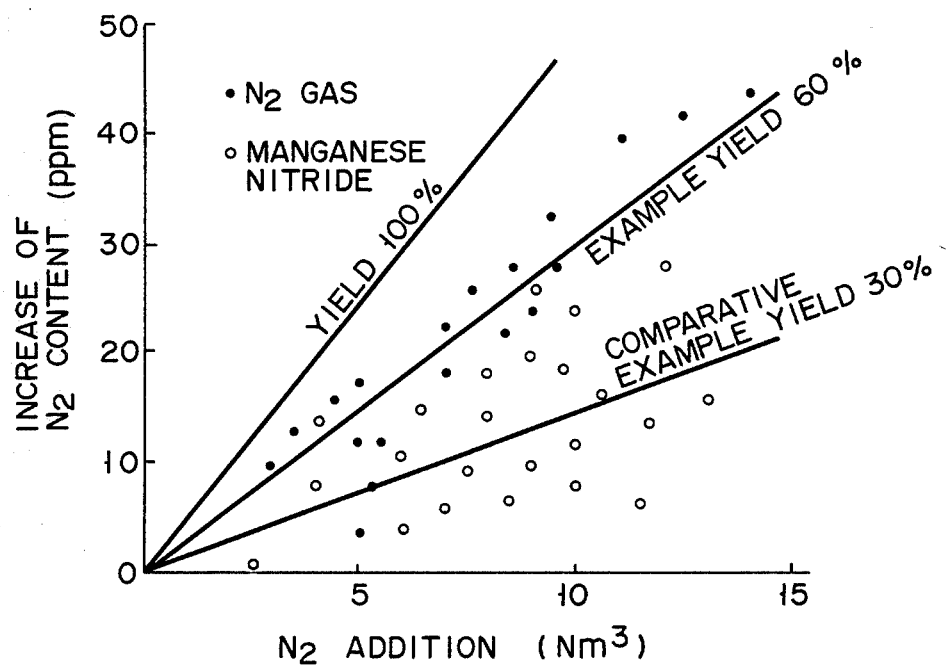
FIG. 10 is a graph showing the relationship between an amount of nitrogen added and an increase in the nitrogen content in the molten steel.

In FIG. 10, in the example, the yield is about 60% and variations thereof are small. Further, in the comparative example, it is found that although the average yield is about 30%, the yield varies widely and is unstable.

According to the example, since nitrogen gas is used instead of manganese nitride, the yield is stable (this was recognized in the example as described above), and steel having a desired nitrogen content can be obtained. Also, when nitrogen gas is used, manganese is not undesirably added to the molten steel. Because of this, the composition of the molten steel can be easily adjusted. Furthermore, nitrogen gas is easily available, thus reducing the cost.

What is claimed is:

1. A method of adjusting the composition of molten steel, comprising the steps of:
   pouring molten steel obtained by converter steelmaking into a ladle while adding an additive containing a component to be added to the molten steel as needed;
   calculating the amount of the additive to be added to the molten steel in the ladel from the composition of the component to be added, a composition analysis value of the molten steel in the converter, and the amount, if any, of the additive added to the molten steel when the molten steel is poured from the converter;
   adding the additive of the amount calculated in said calculating step to the molten steel in the ladle;
   submerging electrodes in a slag layer on the molten steel;
   supplying power to the electrodes submerged in the slag layer on the molten steel so as to generate an electric arc between the electrodes and the molten steel when the adding of the additive to the molten steel is completed, thereby arc-heating the molten steel; and
   introducing a gas in the molten steel through a lance submerged therein, thereby stirring the molten steel.

2. A method according to claim 1, including introducing argon gas in the molten steel through the lance.

3. A method according to claim 1, further comprising the steps of: measuring an oxygen partial pressure of the molten steel before arc-heating so as to calculate the amount of a deoxidation material to be added to the molten steel in accordance with the oxygen partial pressure and the desired amount of deoxidation, and adding the calculated amount of the deoxidation material to the molten steel before arc heating.

4. A method according to claim 3, including providing aluminum as the deoxidation material.

5. A method according to claim 3, further comprising the step of removing the slag on the molten steel before the step of adding the deoxidation material.

6. A method according to claim 1, further comprising the step of adding calcium to the molten steel in the ladle at a rate of no less than 30 kg/min.

7. A method according to claim 6, wherein the calcium is added as a calcium-silicon alloy powder.

8. A method according to claim 7, wherein the calcium is added after arc-heating.

9. A method according to claim 1, including forming the lance as a cylinder having four gas blow ports which are formed in a lower end of the cylinder and from which the gas is blown at an angle of about 45 degrees with respect to the longitudinal direction of the cylinder and is radially spread toward four different directions, and the lance is submerged in the molten steel in the ladle such that the cylinder is inclined.

10. A method according to claim 9, wherein a flow rate of the gas blown through the lance is sufficient enough to cause a part of the slag on the molten steel to be removed from and thus expose a region of the molten steel.

11. A method according to claim 10, including adding the deoxidation material and the additive for adjusting the composition of the molten steel to the molten steel through the exposed region thereof.

12. A method according to claim 11, wherein the flow rate of the gas which is injected in the molten steel through the lance is 2.4 to 3.2 Nl/min per ton of the molten steel.

13. A method according to claim 1, further comprising the step of submerging an auxiliary lance in the molten steel after arc-heating the molten steel, and introducing the gas through the auxiliary lance in the molten steel so as to stir the molten steel.

14. A method according to claim 13, including mixing the flux in the gas which is introduced in the molten steel through the auxiliary lance.

15. A method according to claim 14, wherein the gas introduced in the molten steel through the auxiliary lance is argon gas and is injected at a flow rate of 2 to 4 Nl/min per ton of the molten steel.

16. A method according to claim 14, including mixing the flux at a solid/gas ratio of 5 to 30 kg/kg.

17. A method according to claim 16, including providing the flux as an alloy powder for forming slag.

18. A method according to claim 1, including injecting nitrogen gas in the molten steel through the lance, and providing a predetermined content of nitrogen in the molten steel by injecting nitrogen gas therein.

* * * * *